United States Patent
Mahoney et al.

(10) Patent No.: US 7,096,657 B2
(45) Date of Patent: Aug. 29, 2006

(54) GAS TURBINE ENGINE ELECTROMECHANICAL VARIABLE INLET GUIDE VANE ACTUATION SYSTEM

(75) Inventors: Timothy D. Mahoney, Chandler, AZ (US); James N. Quitmeyer, Chandler, AZ (US); Darrell Horner, Oro Valley, AZ (US); Jeff Miller, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 130 days.

(21) Appl. No.: 10/749,852

(22) Filed: Dec. 30, 2003

(65) Prior Publication Data

US 2005/0147492 A1  Jul. 7, 2005

(51) Int. Cl.
*F02C 9/00* (2006.01)

(52) U.S. Cl. .................. 60/39.25; 60/794; 415/42; 415/150

(58) Field of Classification Search ............... 60/39.25, 60/39.27, 794; 415/42, 150, 160, 161, 162
See application file for complete search history.

(56) References Cited

U.S. PATENT DOCUMENTS

| 2,613,029 | A | * | 10/1952 | Wilde .................. 415/37 |
| 2,823,700 | A | | 2/1958 | Christensen |
| 4,809,497 | A | | 3/1989 | Schuh |
| 5,044,879 | A | | 9/1991 | Farrar |
| 5,206,810 | A | | 4/1993 | Bools et al. |
| 5,281,087 | A | | 1/1994 | Hines |
| 5,486,997 | A | | 1/1996 | Reismiller et al. |
| 5,938,401 | A | * | 8/1999 | Modeen et al. ............... 415/36 |
| 6,039,534 | A | | 3/2000 | Stoner et al. |
| 6,341,238 | B1 | | 1/2002 | Modeen et al. |
| 6,551,057 | B1 | | 4/2003 | Haaser et al. |

FOREIGN PATENT DOCUMENTS

| GB | 913281 | 12/1962 |
| GB | 1 301 615 | 1/1973 |
| GB | 1 499 531 | 2/1978 |

OTHER PUBLICATIONS

TRW Aeronautical Systems, ITP Rolls-Royce Variable State Vane Digital Mock Up, 2002.
PCT International Search Report PCT/US2004/043268 Feb. 2, 2006.

* cited by examiner

*Primary Examiner*—Louis J. Casaregola
(74) *Attorney, Agent, or Firm*—Igrassia Fisher & Lorenz (57) ABSTRACT

An electromechanical inlet guide vane actuation system includes one or more electric motor driven actuators that are used to appropriately position the inlet guide vanes in a gas turbine engine. The actuation system includes a control circuit that supplies guide vane actuation control signals in response to guide vane position command signals it receives. The guide vane actuation control signals are supplied to one or more electric motors, which position actuators, and thus the inlet guide vanes, to the commanded position.

13 Claims, 9 Drawing Sheets

GAS TURBINE ENGINE ELECTROMECHANICAL VARIABLE INLET GUIDE VANE ACTUATION SYSTEM

FIELD OF THE INVENTION

The present invention relates to gas turbine engines and, more particularly, to an electromechanical actuation system for positioning the variable inlet guide vanes of a gas turbine engine.

BACKGROUND OF THE INVENTION

A gas turbine engine may be used to power various types of vehicles and systems. A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section.

The compressor section raises the pressure of the air it receives from the fan section to a relatively high level. In a multi-spool engine, the compressor section may include two or more compressors. For example, in a triple spool engine, the compressor section may include a high pressure compressor, and an intermediate compressor. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section causing rotationally mounted turbine blades to rotate and generate energy. The air exiting the turbine section is exhausted from the engine via the exhaust section, and the energy remaining in this exhaust air aids the thrust generated by the air flowing through the bypass plenum.

Similar to the compressor section, in a multi-spool (e.g., multi-shaft) engine the turbine section may include a plurality of turbines. For example, in a triple spool engine, the turbine section may include a high pressure turbine, an intermediate pressure turbine, and a low pressure turbine. The energy generated in each of the turbines may be used to power other portions of the engine. For example, the low pressure turbine may be used to power the fan via one spool, the intermediate turbine may be used to power the intermediate pressure turbine via another spool that is concentric to the low pressure turbine spool, and the high pressure turbine may be used to power the high pressure compressor via yet another concentric spool.

The output power of a gas turbine engine may be controlled by controlling fuel flow rate to the engine, as well as controlling airflow through the engine. In particular, the fuel flow rate to the engine combustor section may be controlled, and the airflow into and through the compressor section may be controlled. In many aircraft applications, an engine controller such as, for example, a FADEC (Full Authority Digital Engine Controller), controls an engine fuel pressurization system, which may be configured to control both the fuel flow rate to the combustor section, and the airflow into and through the compressor section. In one particular fuel pressurization system, the engine fuel pressurization system may include, among other things, a fuel metering valve and a servo control valve, both of which are configured to respond to commands from the engine controller. The fuel metering valve and servo control valve are both connected to the fuel supply system. The fuel metering valve, in response to commands from the engine controller, controls fuel flow rate to the engine combustor section. The servo control valve, in response to commands from the engine controller, controls fuel flow through actuators coupled to a plurality of movable inlet guide vanes in the engine compressor section, which controls airflow into the engine compressor section.

Although the above-described system and method for controlling turbine engine inlet guide vanes is safe and generally reliable, it suffers certain drawbacks. For example, the fuel pump in the fuel pressurization system may need to be sized to not only deliver the appropriate amount of fuel to the combustor section, but to also supply the appropriate fuel flow rate and pressure to the inlet guide vane actuators. The fuel lines between the servo valves and inlet guide vane actuators are a potential fuel leakage source, which can lead to a postulated loss of engine thrust control. The inlet guide vanes in such systems are typically configured to move to the closed position under postulated abnormal conditions, and thus the engine may not be able to continue operating under such conditions.

SUMMARY OF THE INVENTION

The present invention provides an electromechanical variable inlet guide vane actuation system that consumes less power than other actuation systems, eliminates one or more fuel lines around the engine, and/or allows continued engine operation in the event one or more sections of the guide vane actuation system becomes inoperable.

In one embodiment, and by way of example only, a variable inlet guide vane actuation system includes a control circuit, a primary electric motor, a plurality of drive mechanisms, and a plurality of actuator assemblies. The control circuit is adapted to receive one or more guide vane position command signals and is operable, in response thereto, to supply guide vane actuation control signals. The primary electric motor is coupled to receive the guide vane actuation control signals and is operable, in response thereto, to supply a drive force. The plurality of drive mechanisms are each coupled to receive the drive force, and each actuator assembly is coupled to at least one of the drive mechanisms and is configured, upon receipt of the drive force, to selectively move between a closed position and an open position.

In another exemplary embodiment, a variable inlet guide vane actuation system includes a control circuit, a primary electric motor, a plurality of drive mechanisms, and a plurality of actuator assemblies. The control circuit includes a primary channel and a secondary channel, and each channel is adapted to receive one or more guide vane position command signals and is operable, in response thereto, to selectively supply guide vane actuation control signals. The primary electric motor is coupled to receive the guide vane actuation control signals and is operable, in response thereto, to supply a drive force. The plurality of drive mechanisms are each coupled to receive the drive force, and each actuator assembly is coupled to at least one of the drive mechanisms and is configured, upon receipt of the drive force, to selectively move between a closed position and an open position.

In yet another exemplary embodiment, a variable inlet guide vane actuation system includes a control circuit, first and second primary electric motors, first and second secondary electric motors, and first and second actuator assemblies. The control circuit includes a primary channel and a secondary channel, with each channel including a first motor controller and a second motor controller. Each motor controller in each channel is adapted to receive one or more guide vane position command signals and is operable, in response thereto, to supply guide vane actuation control signals. The first primary electric motor is coupled to receive the guide vane actuation control signals from the primary channel first motor controller and is operable, in response thereto, to supply a drive force. The second primary electric motor is coupled to receive the guide vane actuation control signals from the primary channel second motor controller and is operable, in response thereto, to supply a drive force. The first secondary electric motor is coupled to receive the guide vane actuation control signals from the secondary channel first motor controller and is operable, in response thereto, to supply a drive force. The second secondary electric motor is coupled to receive the guide vane actuation control signals from the secondary channel second motor controller and is operable, in response thereto, to supply a drive force. The first actuator assembly is coupled to the first primary and the first secondary electric motors and is configured, upon receipt of the drive force therefrom, to selectively move between a closed position and an open position. The second actuator assembly is coupled to the second primary and second secondary electric motors and is configured, upon receipt of the drive force therefrom, to selectively move between a closed position and an open position. The control circuit is configured such that when the primary channel is active the secondary channel is inactive, and vice-versa.

In still another embodiment, an engine controller includes an error circuit and a fuel flow control circuit. The error circuit is adapted to receive at least a signal representative of a commanded inlet guide vane position and a signal representative of actual inlet guide vane position and is operable, in response thereto, to supply an error signal representative of an error between the commanded inlet guide vane position and the actual inlet guide vane position. The fuel flow control circuit is adapted to receive at least a thrust request signal and the error signal and is operable, in response thereto, to supply a fuel flow control signal.

Other independent features and advantages of the preferred inlet guide vane actuation control system, engines, and engine controller will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of turbine engine, or even to use in a turbine. Thus, although the present embodiment is, for convenience of explanation, depicted and described as being implemented in a multi-spool turbofan gas turbine jet engine, it will be appreciated that it can be implemented in various other types of turbines, and in various other systems and environments.

Figure 1:
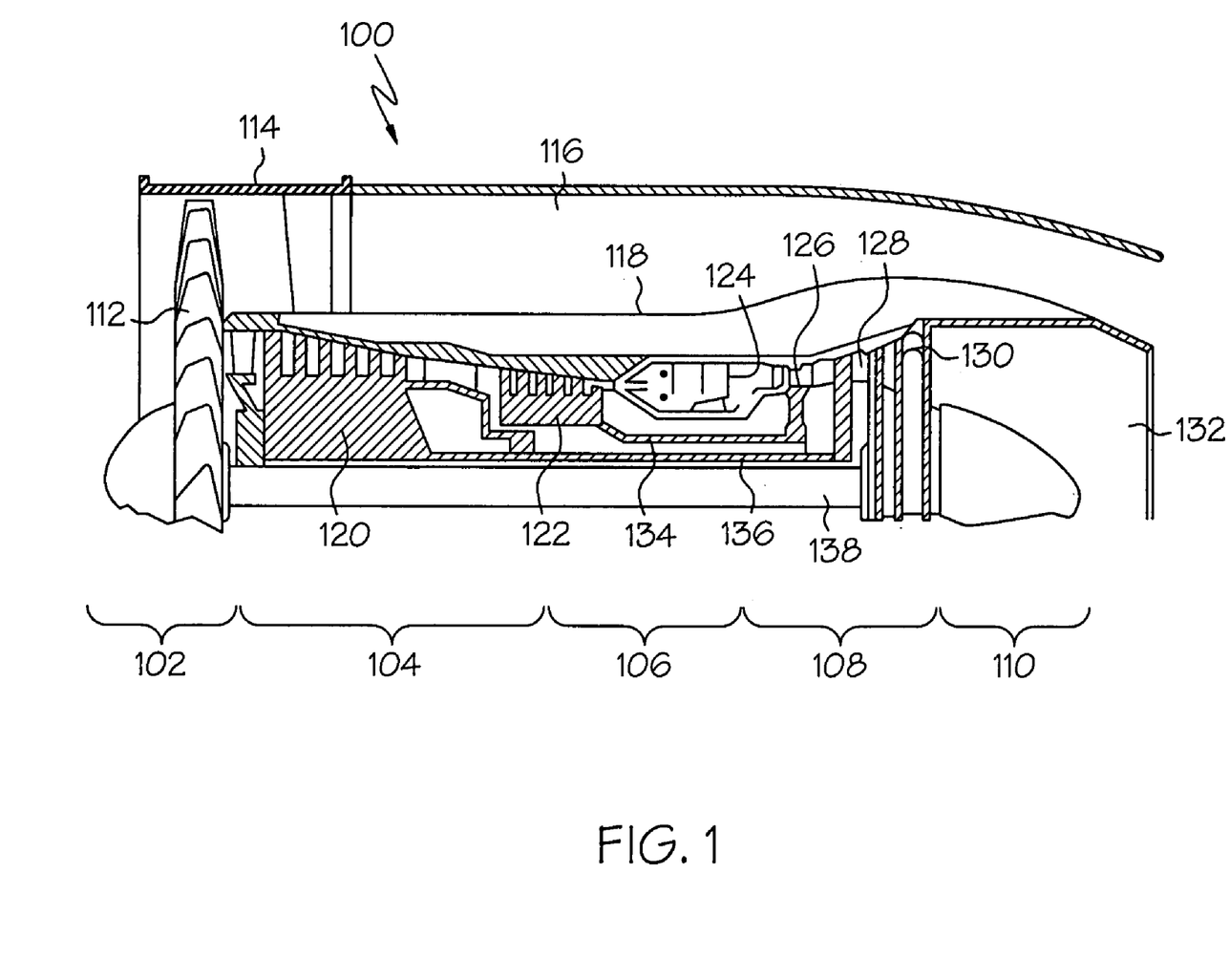
FIG. 1 is an exemplary embodiment of a multi-spool turbofan gas turbine jet engine.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a plurality of combustors 124, the high pressure air is mixed with fuel and combusted. The combusted air is then directed into the turbine section 108.

The turbine section 108 includes three turbines disposed in axial flow series, a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110, providing addition forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

Figure 2:
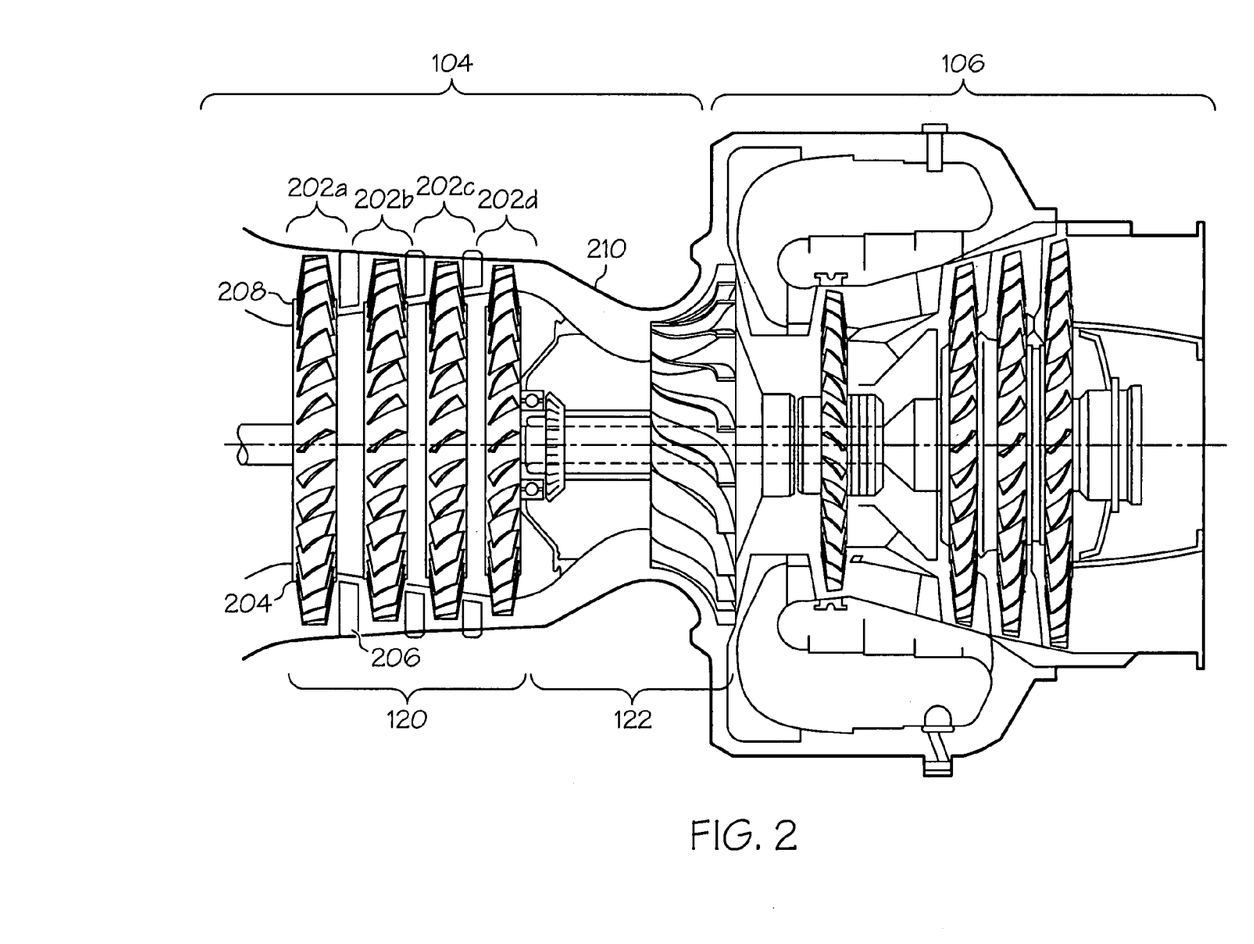
FIG. 2 is a close up cross-section side view of the compressor, combustor, and turbine sections of the exemplary gas turbine engine depicted in FIG. 1.
Figure 3:
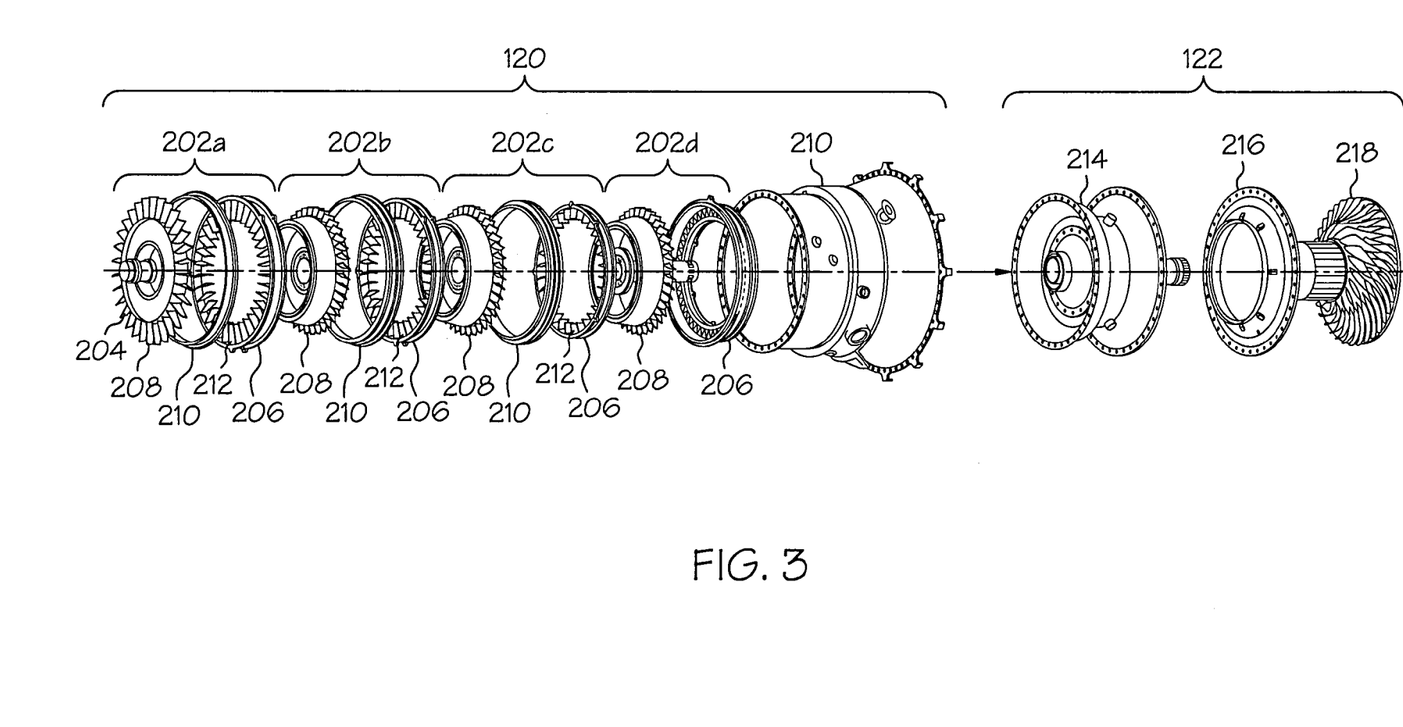
FIG. 3 is an exploded view of the compressor section depicted in FIG. 2.

Turning now to FIGS. 2 and 3, a more detailed description of the compressor section 104 in the above-described engine 100 will be provided. As was previously noted, the compressor section 104 includes an intermediate pressure section 120 and a high pressure section 122. The intermediate pressure section 120 includes multiple stages, and in the depicted embodiment includes four stages 202a–d. Each intermediate pressure section stage 202a–d includes a rotor 204 and a stator 206. Each of the rotors 204 has a plurality of rotor blades 208 and is surrounded by a shroud 210. As the rotors 204 rotate, the rotor blades 208 force air through each of the stators 206 in a subsequent stage. As shown more clearly in FIG. 3, each stator 206 includes a plurality of inlet guide vanes 212. As the air from the rotors 204 travels through the inlet guide vanes 212, it is forced to travel at an angle to the next stage 202, thereby increasing the air pressure as the air travels from stage to stage. As will be described in more detailed further below, the inlet guide vanes 212 are moveable, and are used to control the amount of airflow into and through the compressor section 104, and thus into and through the turbine section 108.

The compressor high pressure section 122, in the depicted embodiment, includes a high pressure diffuser case 214, a shroud 216, and a high pressure impeller 218. The high pressure diffuser case 214 couples the compressor low pressure section 120 to the compressor high pressure section 122 and directs the air exhausted from the fourth intermediate compressor stage 202d into high pressure impeller 218. The shroud 216 is mounted to the diffuser case 214 and surrounds a portion of the high pressure impeller 218.

Figure 4:
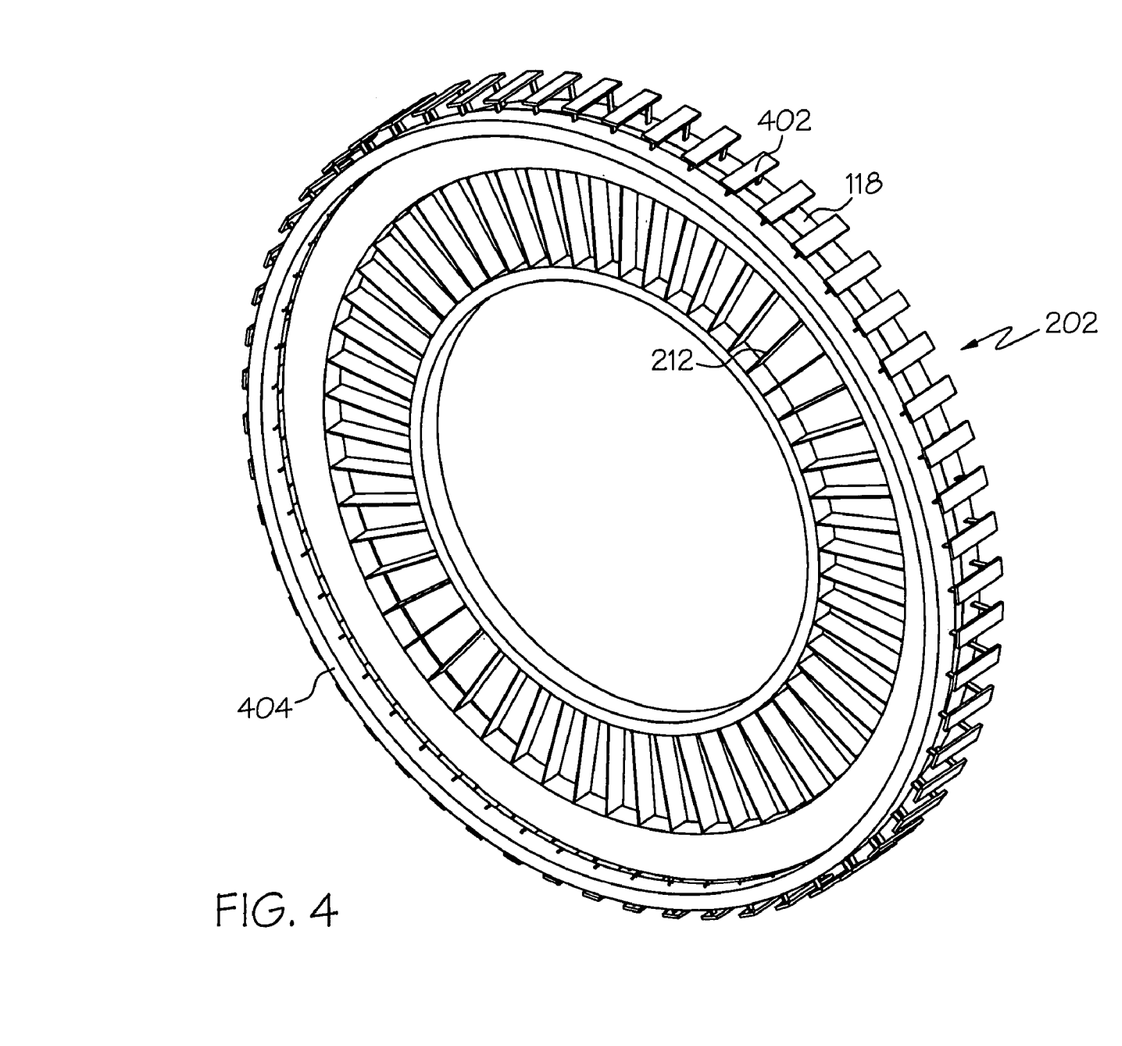
FIG. 4 is a perspective view of a portion of an exemplary one of the compressor intermediate pressure section stages shown in FIGS. 2 and 3.

With reference now to FIG. 4, a perspective view of a portion an exemplary embodiment of one of the compressor intermediate pressure section stages 202 is shown, and will now be described in more detail. Each stage 202 includes the plurality of inlet guide vanes 212, a plurality of vane arms 402, and a unison ring 402. The inlet guide vanes 212 are rotationally mounted within, and are circumferentially disposed around, the engine cowl 118 in the compressor intermediate pressure section 120. The inlet guide vanes 212 may be rotated between a closed position, in which airflow through the inlet guide vanes 212, and thus the compressor section 106, is substantially prevented, and an open position, in which airflow through inlet guide vanes 212 is substantially uninhibited. The inlet guide vanes 212 may also be rotated to a position between the closed and open position, to thereby regulate airflow through the compressor section 106.

The inlet guide vanes 212 are each coupled to one of the vane arms 402, which in turn are each coupled to the unison ring 404. The unison ring 404 is rotationally mounted within the compressor intermediate pressure section stage 202. Thus, as the unison ring 404 rotates, it causes each of the vane arms 402 to rotate, which in turn causes each of the inlet guide vanes 212 to rotate to the desired position. The unison ring 404 is coupled to an inlet guide vane actuation system 500, which controls the rotational position of the unison ring 404 in each of compressor intermediate pressure stages 202. With reference to FIGS. 5–8, a detailed description of various exemplary embodiments of the inlet guide vane actuation system 500 will now be provided.

Figure 5:
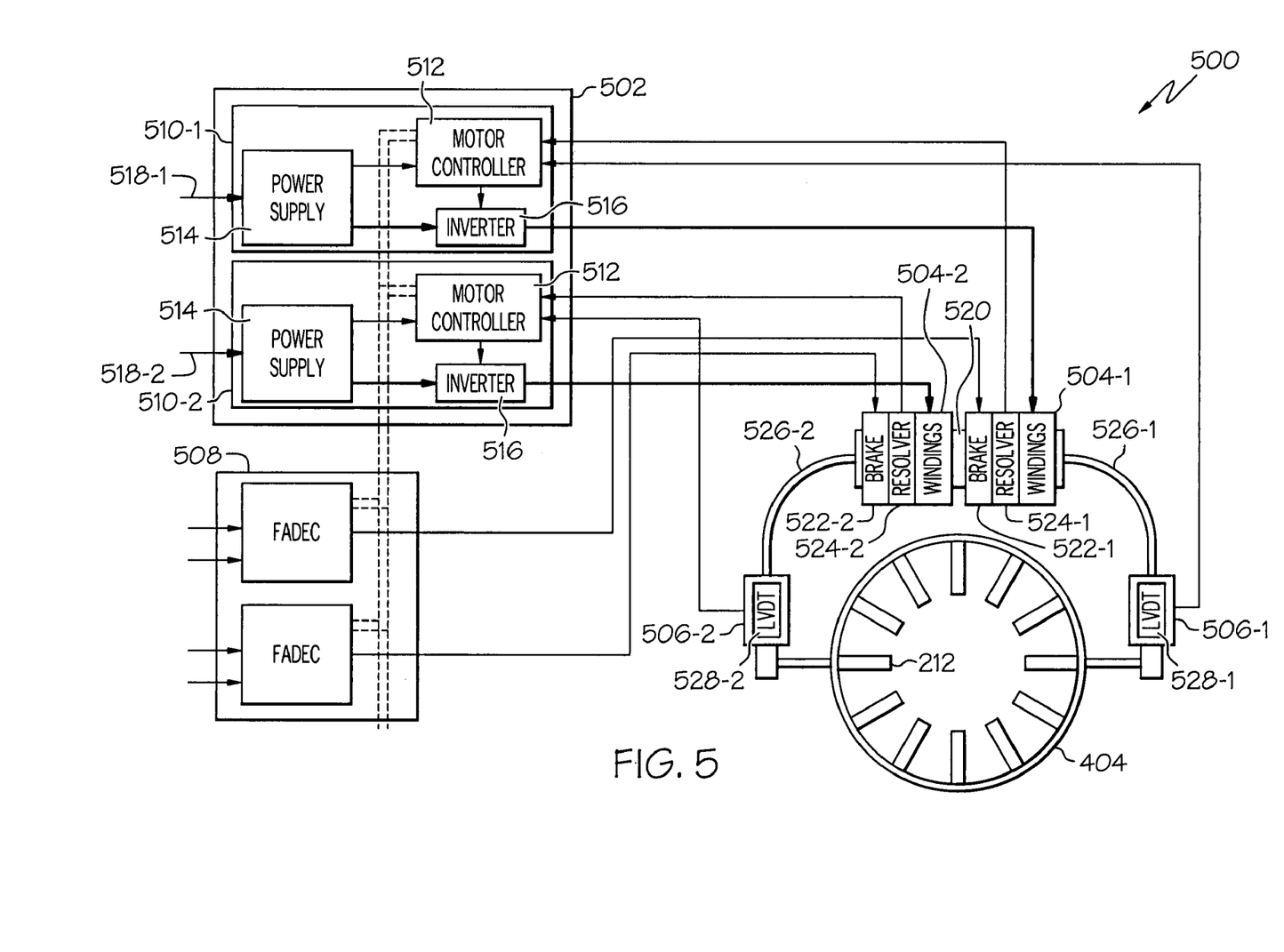
FIG. 5 is a functional block diagram of an inlet guide vane actuation system, according to an exemplary embodiment of the present invention, that may be used with the engine of FIG. 1.

Referring first to FIG. 5, it is seen that the inlet guide vane actuation system 500 includes a control circuit 502, a plurality of motors 504, and a plurality of actuator assemblies 506. The control circuit 502 is coupled to a main engine controller 508, which in the depicted embodiment is a multi-channel FADEC. As was noted above, the FADEC 508, in addition to controlling the fuel flow rate to the combustor section 104, also controls the airflow into and through the compressor section 106. To do so the FADEC 508, in the depicted embodiment, supplies appropriate guide vane position command signals to the control circuit 502. The control circuit 502 in turn supplies appropriate guide vane actuation control signals to one of the motors 504.

The control circuit 502 is preferably a multi-channel control circuit, and in the embodiment depicted in FIG. 5 includes a primary channel 510-1 and an independent secondary channel 510-2. The control circuit 502 may be configured such that when the primary channel 510-1 is active, the secondary channel 510-2 is inactive, and vice-versa. Alternatively, the control circuit 502 may be configured such that the independent primary 510-1 and secondary 510-2 channels are both simultaneously active during normal operations. With this latter configuration, one of the channels 510-1 (or 510-2) will remain active if the other channel 510-2 (or 510-1) becomes inactive, or otherwise inoperable. In addition, with this latter configuration, the primary 510-1 and secondary 510-2 channels are preferably operated synchronously to provide the appropriate functionality.

The primary 510-1 and secondary 510-2 channels each include a motor controller circuit 512. Depending upon whether the motors 504 are DC-type or AC-type motors, each channel 510-1, 510-2 may additionally include a power supply circuit 514 and an inverter circuit 516. For example, if the motors 504 are DC-type motors, each channel 510-1, 510-2 in the control circuit 502 preferably includes both the power supply circuit 514 and the inverter circuit 516 (shown in phantom in FIG. 5). In the case of DC motors, the power supply circuits 514 in each channel 510-1, 510-2, which may be implemented using any one of numerous known configurations, rectify and filter the AC signal from an AC supply bus 518-1, 518-2 to which each is coupled, and supply appropriate DC voltage signals to both the motor controller circuit 512 and the inverter circuit 516 in the associated channel 510-1, 510-2. Conversely, if the motors 504 are AC-type motors, the motors 504 may be powered from the AC supply bus 518-1, 518-2, without the power supply circuit (via the control circuit 502, if desired). However, it will be appreciated that each channel 510-1, 510-2 in the control circuit 502 may include the power supply circuit 514 if the AC supply busses 518-1, 518-2 are not of appropriate voltage magnitude. It will additionally be appreciated that either type of motor may be used, and that the selection may vary from system to system and/or engine to engine.

The motors 504, as was just noted above, may be any one of numerous types of DC-type or AC-type motors and, as FIG. 5 shows, preferably two motors, a primary motor 504-1 and a secondary motor 504-2, are used. It will be appreciated that the type of motor 504 used, either DC or AC, can affect the configuration and functionality of the motor control circuit 502, as well as the physical configuration and implementation of the motors 504-1, 504-2. It will additionally be appreciated that no matter which type of motor is used, either DC or AC, the primary motor 504-1 is preferably coupled to only the primary channel 510-1, while the secondary motor 504-2 is preferably coupled to only the secondary channel 510-2. Thus, the primary motor 504-1 receives guide vane actuation control signals from only the control circuit primary channel 510-2, and the secondary motor 504-2 receives guide vane actuation control signals only from the control circuit secondary channel 510-2.

With the above-noted information in mind, if DC motors are used, each motor 504-1, 504-2 is preferably a brushless DC type motor, and only a single motor control circuit channel 510-1, 510-2 is ever active at one time. In addition, the primary 504-1 and secondary 504-2 motors are coupled together via, for example, a speed summing differential gearbox 520. The reason for the gearbox 520 and the preferred channel functionality will be explained further below. Conversely, if AC motors are used, each motor 504 1, 504-2 is preferably an AC induction or switched reluctance type motor, and the primary 510-1 and secondary 510-2 channels, while being physically independent, are preferably configured to operate synchronously with one another. Thus, both motors 504-1, 504-2 simultaneously receive guide vane actuation control signals from the control circuit channels 510-1, 510-2 to which each is coupled.

If AC motors are used, the motors 504-1, 504-2 are preferably mounted on the same shaft, without the intervening speed summing differential gearbox 520. It will be appreciated that the speed summing differential gearbox 520 could be used with the AC motors; however, the gearbox 520 is preferably not used, since a weight savings can be realized by not including the gearbox 520. It will additionally be appreciated that even if AC motors are used, the system 500 could be configured such that only one of the control circuit channels 510-1, 510-2 is ever active at any one time. With this latter configuration, which is like that described when DC motors are used, only one of the motors 504-1 or 504-2 receives guide vane actuation control signals from one of the active control circuit channels 510-1 or 510-2, respectively. Thus, if AC motors are used, the system can be configured to allow the primary 504-1 and secondary 504-2 motors to be operated in either an active/active mode or an active/standby mode, as desired.

Before proceeding further with the description, it was previously noted that when brushless DC motors are used, the system 500 is configured such that only one of the motors 504-1 or 504-2 receives guide vane actuation control signals from one of the single independent control circuit channels 510-1 or 510-2, respectively, and are coupled together via the speed summing differential gearbox 520. One reason for this is that brushless DC motors act as generators when the motor is rotated while the windings are not energized with electrical power. Thus, if brushless DC motors were implemented using the system configuration in which the control circuit primary 510-1 and secondary 510-2 channels are operated synchronously, if one of the channels 510-1, 510-2 became inactive, or otherwise inoperable, the motor 504-1 or 504-2 coupled to the inactive channel 510-1 or 510-2, respectively, would undesirably supply the generated electrical power back to the inactive channel. It will be appreciated that in an alternate embodiment, the DC motors could be mounted on the same shaft without the intervening gearbox 520, and be operated synchronously, similar to the preferred configuration when AC motors are used. In this latter instance, however, if or when one of the DC motors was not operating, the system would preferably be configured so that the non-operating DC motor would be electrically decoupled from its control channel 510-1, 510-2 to prevent any voltage generated by the non-operating DC motor from being fed back to the control channel.

Returning now to the description, FIG. 5 also shows that the primary 504-1 and secondary 504-2 motors, whether AC induction or brushless DC motors are used, each preferably have a brake 522-1 and 522-2, respectively, coupled thereto. The brakes 522-1, 522-2 are preferably configured to be energize-to-release type brakes, and prevent unintended motor rotation, and thus unintended movement of the inlet inlet guide vanes 212. In the depicted embodiment, the brakes 522-1, 522-2 are each coupled to receive brake command signals from the independent channels within the FADEC 508. However, it will be appreciated that the brake command signals could instead be generated by, and supplied from, the control circuit 502, in response to appropriate command signals from the FADEC 508. It will be appreciated that including the brakes 522-1, 522-2 in the system 500 is merely exemplary of a particular preferred embodiment, and that the brakes 522-1, 522-2 could, in some system configurations, be eliminated.

A rotational position sensor 524, which may be, for example, a resolver, is also coupled to each of the motors 504-1, 504-2. The rotational position sensors 5241 and 524-2 supply signals representative of the rotational position of the primary 504-1 and secondary 504-2 motors, respectively, to the control circuit primary 510-1 and secondary 510-2 channels, respectively. The control circuit 502 uses the rotational positional signals to, among other things, ensure the motors 504-1, 504-2 are properly commutated. It will be appreciated that the use of the rotational position sensors 524-1, 524-2 is merely exemplary of a particular preferred embodiment, and that the system 500 could be implemented without rotational position sensors. In such a case, the motors 504-1, 504-2 can be controlled using any one of numerous known sensorless control techniques.

No matter the particular type or configuration of the motors 504, each is operable, in response to the guide vane actuation control signals it receives from the control circuit 502, to supply a drive force in one of two directions, either an open direction or a close direction. The actuator assemblies 506 are coupled to receive the drive force and are configured, in response to the drive force, to move the inlet guide vanes 212 to a desired position. In the embodiment shown in FIG. 5, the drive force from the motors 504 is supplied to the actuators 506 via a plurality of drive mechanisms 526. In the depicted embodiment, the drive mechanisms 526 are each a flexible shaft, though it will be appreciated that this is merely exemplary of a particular preferred embodiment.

The actuator assemblies 506 are individually coupled to the unison ring 404. In a preferred embodiment, one actuator assembly 506-1 is coupled to one side of the unison ring 404, and a second actuator assembly 506-2 is coupled to another side of the unison ring 404. It is noted that the actuator assemblies 506-1, 506-2 may be any one of numerous actuator assembly designs presently known in the art or hereafter designed. However, in this embodiment the actuator assemblies 506-1, 506-2 are preferably conventional ballscrew-type actuator assemblies. The construction of the actuator assemblies 506-1, 506-2 that are preferably used in the depicted embodiment is generally well known and will therefore not be further described. It is additionally noted that the number and arrangement of actuator assemblies 506-1, 506-2 is not limited to what is depicted in FIG. 5, but could include other numbers of actuator assemblies 506 as well. The number and arrangement of actuators is selected to meet the specific design requirements of the system.

The actuator assemblies 506-1 and 506-2 each include a position sensor 528-1 and 528-2, respectively. The position sensors 528-1 and 528-2 supply signals to the motor controller circuit 512 in the primary 510-1 and secondary 510-2 channels, respectively, that are representative of actuator assembly position. Because the actuator assemblies 506-1, 506-2 are coupled to the inlet guide vanes 212, via the unison ring 404, the position signals are also representative of inlet guide vane position. The position sensors 528-1, 528-2 may be any one of numerous types of position sensors including, but not limited to, RVDTs (rotary variable differential transformers), potentiometers, Hall effect sensors, or eddy current sensors. In the depicted embodiment, however, the positions sensors 528-1, 528-2 are each LVDT (linear variable differential transformer) type of sensors. It will be appreciated that the use of the position sensors 528 is merely exemplary of a particular preferred embodiment, and that other control schemes, other than a position control loop, could be used. For example, a motor speed loop, or various other schemes, could be used instead.

The FADEC 508 includes a schedule of inlet guide vane position versus engine shaft speed and ambient conditions. It will be appreciated that the schedule may vary from engine type to engine type, and is selected to substantially optimize engine performance. During operation of the engine 100, if the FADEC 508 determines that the inlet guide vanes 212 should be repositioned from the current position, the FADEC 508 issues an appropriate inlet guide vane position command, and a brake release command. The inlet guide vane position command is received by the control circuit 502, and the brake release command is received by either, or both, brakes 522, depending on the system configuration.

In response to the brake release command, the brake (or brakes) 522 releases, allowing the associated motor (or motors) 504 to rotate. In response to the inlet guide vane position command, the channel (or channels) 510 in the control circuit 502 issues appropriate inlet guide vane actuation control signals to the motor (or motors) 504, causing the motor (or motors) 504 to rotate and supply a drive force in the appropriate direction. As was alluded to above, the direction in which the motor (or motors) 504 rotate will depend upon whether the inlet guide vanes 212 are being positioned toward the full open or full closed position. In either case, upon rotation of the motor (or motors) 504, the drive force the motor (or motors) 504 supplies is coupled to the actuators 506, via the drive mechanisms 526, causing the actuators to move in either an open or close direction, as appropriate.

The unison ring 404, which is coupled to the actuators 506, rotates in either an open or close direction in response to actuator movement. As a result, the inlet guide vanes 212 also rotate, in either the open or close direction, in response to unison ring rotation. The motor (or motors) 504 will continue to rotate and move the actuators-506, unison ring 404, an inlet guide vanes 212 until the inlet guide vanes 212 reach the position commanded by the FADEC 508. The actuator position sensors 528 supply position feedback signals representative of actuator position, and thus inlet guide vane position, to the control circuit 502. Thus, when the position feedback signals indicate that inlet guide vanes 212 have reached the commanded position, the control circuit will do-energize the motor (or motors) 504. In addition, the FADEC 508 will issue a brake engage command, causing the brake (or brakes) 522 to engage. It will be appreciated that the brake engage command could simply be the removal of power from the brake (or brakes) 522.

Figure 6:
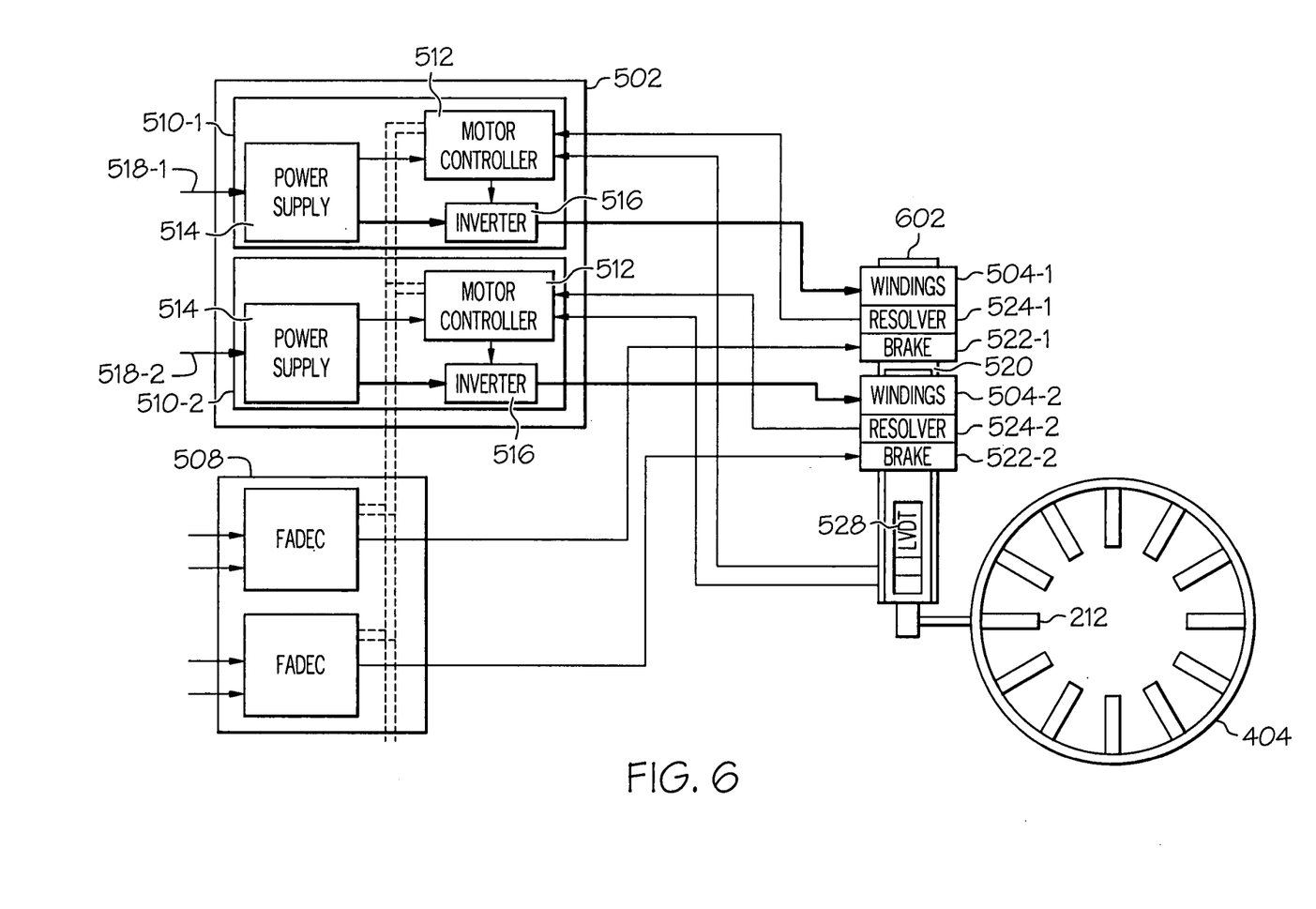
FIGS. 6 and 7 are each exemplary alternative embodiments of an inlet guide vane actuation system, according to an exemplary embodiment of the present invention, that may be used with the engine of FIG. 1.

The variable inlet guide vane actuation system 500 depicted in FIG. 5 is merely exemplary of one particular configuration that may be implemented. Various other configurations, such as those depicted in FIGS. 6 and 7, in which like reference numerals refer to like parts of the previously described system 500, may also be implemented. The system 600 depicted in FIG. 6 is configured similar to the system in FIG. 5, except that the primary 504-1 and secondary 504-2 motors are both coupled to a single actuator assembly 602, and thus no drive mechanisms are used. In addition, because a single actuator assembly 602 is used, the unison ring 402 is preferably hardened, to increase overall system reliability, and a dual output actuator position sensor 528 is used.

Figure 7:
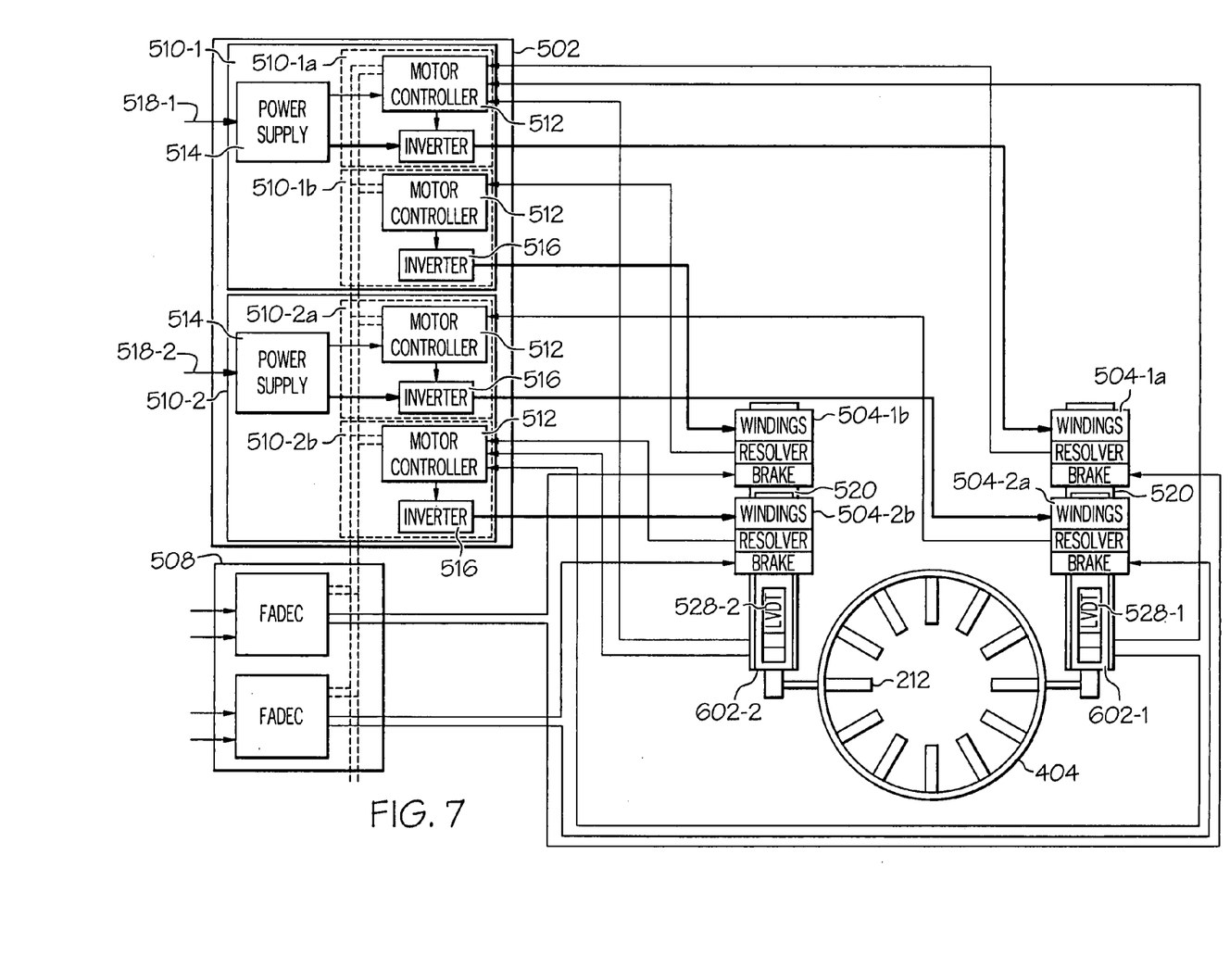

The system 700 depicted in FIG. 7, is somewhat of a hybrid of the two previously described systems 500, 600, except that the control circuit 502 is implemented as a two dual-channel configuration, and two dual-input actuator assemblies 602-1, 602-2 are used. That is, each independent control circuit channel 510-1 and 510-2 includes two channels 510-1a, 510-1b and 510-2a, 510-2b, respectively. The channels 510-1a, 510-1b in one control circuit channel 510-1, are coupled to one of the motors 504-1a on one actuator assembly 602-1 and to another motor 504-2a on the other actuator assembly 602-2. Similarly, channels 510-2a, 510-2b in the other control circuit channel 510-2, are coupled to one of the other motors 504-1b on one actuator assembly 602-1 and to another motor 504-2b on the other actuator assembly 602-2. Because of the redundancy in this system 700, the unison ring 402 need not be hardened, as is preferably done in the system 600 of FIG. 6.

Figure 8:
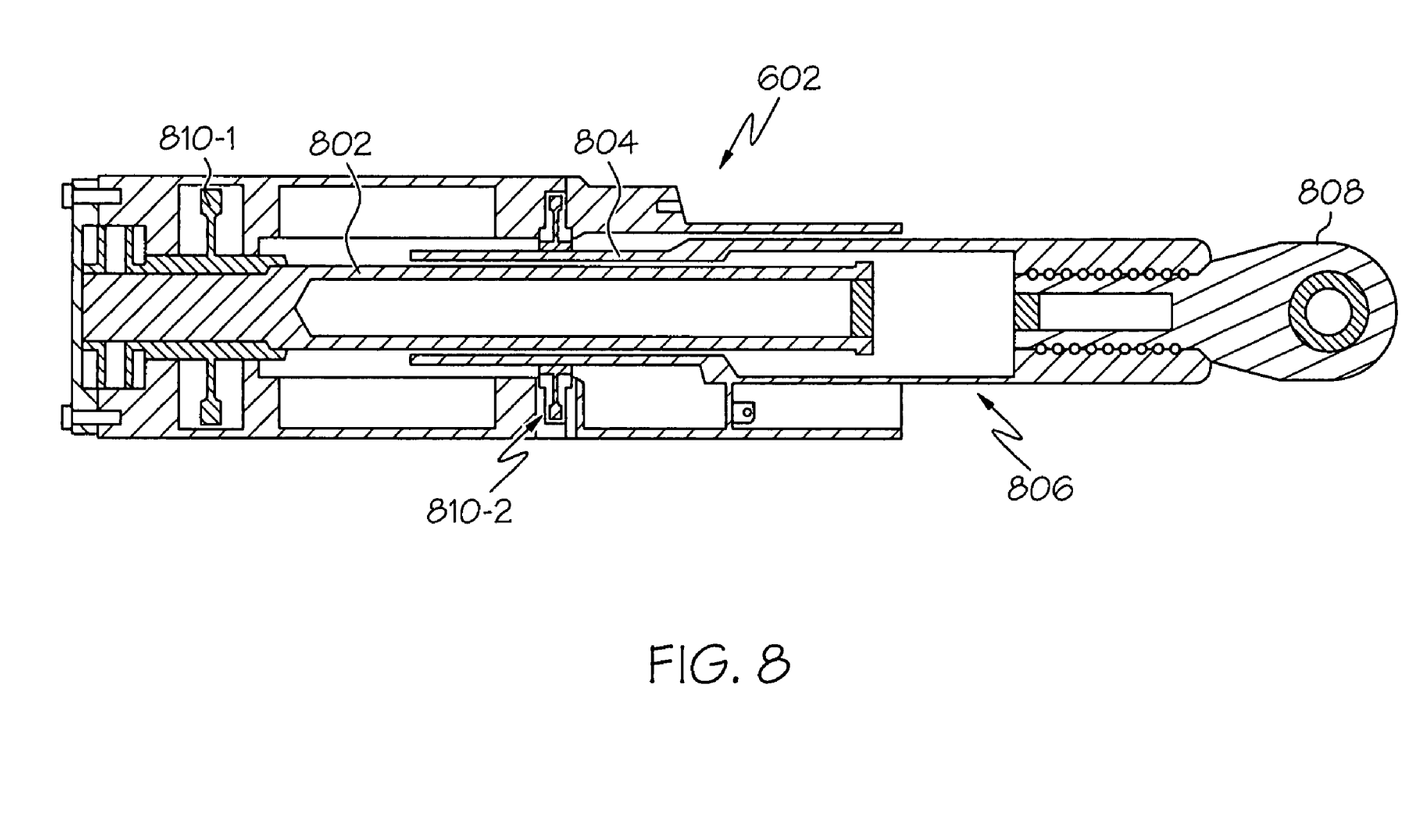
FIG. 8 is a cross section view of an exemplary dual input actuator assembly that may be used in the inlet guide vane actuation control system of FIG. 6.

Because the actuator assemblies 602 used in the systems 600 and 700 depicted in FIGS. 6 and 7, respectively, differ from that used in the system 500 of FIG. 5, a particular preferred embodiment of the actuator assembly 602 is illustrated in FIG. 8, and will now be briefly described. The actuator assembly 602 is similar to various conventional actuator assemblies, in that it includes a ballscrew 802, a ballnut 804, an output tube 806, and a rod end 808. The ballscrew 802 is rotationally mounted within an actuator housing assembly 810, the ballnut 804 is mounted on the ballscrew 802 and is coupled to the output tube 806, and the rod end 808 is coupled to the output tube 806.

One difference that the depicted actuator assembly 602 has from other conventional ballscrew actuator assemblies is that the actuator assembly 602 includes two input spur gears 810-1, 810-2. The first input spur gear 810-1 is coupled to, and is configured to drive, the ballscrew 802, and the second input spur gear 810-2 is coupled to, and is configured to drive, the ball nut 804. When the first input spur gear 810-1 is rotated, it causes the ballscrew 802 to rotate, which in turn causes the ballnut 804 to translate. Translation of the ballnut 804 in turn causes the output tube 806 and rod end 808 to also translate. Conversely, if the second spur gear 810-2 is rotated, the ballnut 804 rotates around the ballscrew 802. Rotation of the ballnut 804 around the ballscrew 802 also results in translation of the ballnut 804, and thus translation of the output tube 806 and rod end 808.

In each of the above-described systems 500, 600, 700, if the control circuit primary 510-1 and secondary 510-2 channels were to become inoperable, neither the primary 504-1 nor the secondary 504-2 would be operable, and the brakes 522-1, 522-2 would lock the primary 504-1 and secondary 504-2 motors in place. Thus, the inlet guide vanes 212 would remain fixed in the position each was in when the control circuit primary 510-1 and secondary 510-2 channels became inoperable. To accommodate such an unlikely scenario, the FADEC 508 is preferably configured to include appropriate detection and accommodation logic and, with reference to FIG. 9, will now be described.

Figure 9:
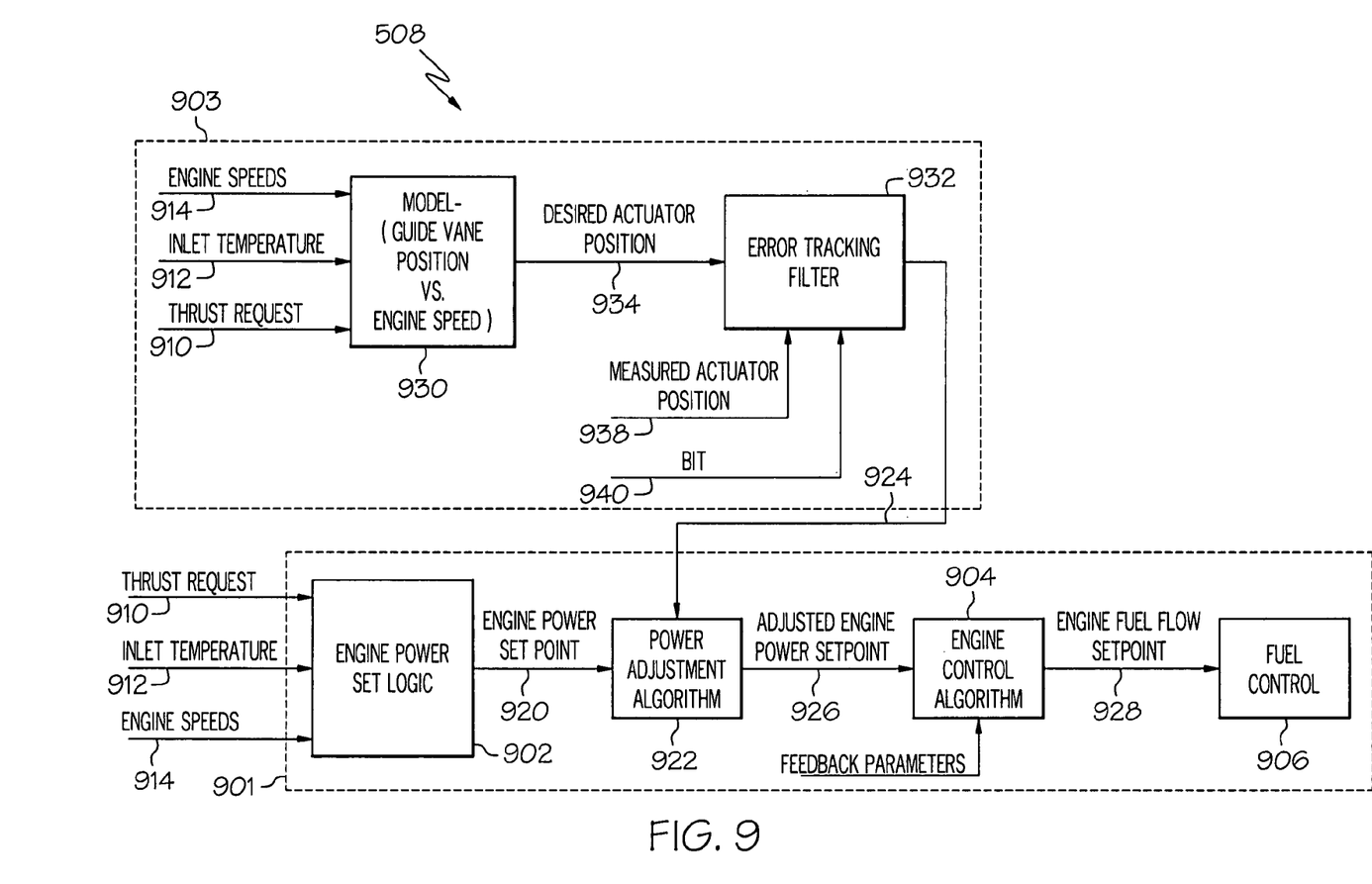
FIG. 9 is a functional block diagram of a portion of an engine controller that may be used with the exemplary inlet guide vane actuation control systems shown in FIGS. 5–7.

A functional block diagram of a portion of one of the FADEC 508 channels is shown in FIG. 9, and includes at least a fuel control circuit 901 and an error circuit 903. The fuel control circuit 901 includes an engine power set logic block 902, an engine control algorithms block 904, a fuel control block 906, and a power adjustment algorithm block 922. Preferably, the engine power set logic block 902, the engine control algorithm block 904, and the fuel control block 906 are each conventional, though it will be appreciated that one or more of these functional blocks could be specially configured and implemented. It will additionally be appreciated that one or more of the engine power set logic block 902, the engine control algorithm block 904, the fuel control block 906, and the error circuit 903, or portions thereof, could be implemented in hardware, software, firmware, or combinations thereof.

In any case, it is seen that the engine power set logic block 902 is configured to receive a plurality of input signals. These signals include a thrust request signal 910, which is representative of the thrust requested by the aircraft pilot using, for example, a throttle input lever (not shown). The engine power set logic block 902 also receives signals representative of various engine parameters. For example, the engine power set logic block 902 receives an engine inlet temperature signal 912, and an engine speed signal 914. It will be appreciated that the engine power set logic block 902 could also be configured to receive various other signals representative of one or more additional engine parameters; however, for clarity and ease of explanation, these additional parameter-representative signals is neither depicted nor described.

The engine power set logic block 902 is configured, in response to each of the input signals it receives, to determine and supply an engine power set point signal 920. The engine power set point signal 920 is supplied to the power adjustment algorithm block 922. The power adjustment algorithm block 922, as will be described more fully below, also receives an inlet guide vane position error signal 924 and is configured, in response to these two signals 920, 924, to supply an adjusted engine power set point signal 926 to the engine control algorithm block 904.

The engine control algorithm block 904 is used to supply an engine fuel flow setpoint signal 928 to the fuel control block 906. In particular, the engine control algorithm block 904 receives the adjusted engine power setpoint signal 926 and, in combination with various feedback parameters, supplies the engine fuel flow setpoint signal 928. The fuel control block 906 in turn adjusts the flow of fuel to the combustors 124 in the engine combustor section 106 by, for example, adjusting the position of one or more valves in a fuel supply line (not shown) coupled to the engine 100.

Turning now to the error circuit block 903, it is seen that this functional circuit block includes a model of inlet guide vane position versus engine speed 930, and an error tracking filter block 932. The model 930 receives a plurality of input signals and, based on these input signals, supplies a signal 934 representative of desired inlet guide vane actuator position. The signals that the model 930 receives could be any one of numerous types of engine-related signals, that preferably include at least the thrust request signal 910, the engine inlet temperature signal 912, and the engine speed signal 914.

The error tracking filter block 932 is coupled to receive the desired inlet guide vane actuator position signal 934, as well as two other signals, and is configured, in response to these input signals, to supply the inlet guide vane actuation position error signal 924. The two other signals that the error tracking filter block 932 receives include an actual actuator position signal 938 and a built-in-test (BIT) status signal 940. The actual actuator position signal 938 is supplied from the actuator position sensors 528, and the BIT signal 940 is supplied from BIT circuitry (not illustrated) that is used to test, in real-time, various system sensors and effectors.

During normal system 500, 600, 700 operations, the inlet guide vane actuation position error signal 924 supplied from the error tracking filter block 932 to the power adjustment algorithm block 922 will indicate that no error exists between the desired actuator position and the actual (or measured) actuator position. However, if both channels 510-1, 510-2 in the control circuit 502 become inoperable, the motors 504 will not move the actuator assemblies 526, 602, and if the FADEC 508 issues a guide vane position command signal, the actuator assemblies 526, 602 will not move. Thus, the inlet guide vanes 212 will remain in a fixed position and the inlet guide vane actuation position error signal 924 will indicate an error between the actual and desired actuator assembly position. In turn, the adjusted engine power set point signal 926 supplied by the power adjustment algorithm block 922 to the engine control algorithm block 904 will be based on the fixed inlet guide vane position. In particular, the adjusted engine power set point signal 926 supplied by the power adjustment algorithm block 922 will control the engine 100 at a fixed speed.

The electromechanical variable inlet guide vane actuation systems 500, 600, 700 described herein consume less power than other known actuation systems, and eliminate one or more fuel lines around the engine. The systems also provide for continued engine operation at a fixed speed in the event one or more sections of the guide vane actuation system 500, 600, 700 becomes inoperable. This latter provision eliminates any need for a dedicated engine driven alternator to supply power.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A variable inlet guide vane actuation system, comprising
   a control circuit including a primary channel and a secondary channel, each channel adapted to receive one or more guide vane position control signals and operable, in response thereto, to selectively supply guide vane actuation control signals;
   a primary electric motor coupled to receive the guide vane actuation control signals from the primary channel and operable, in response thereto, to supply a drive force;
   a secondary electric motor coupled to receive the guide vane actuation control signals from the secondary channel and operable, in response thereto, to supply a drive force; and
   an actuator assembly coupled to the primary and secondary electric motors and configured, upon receipt of the drive force therefrom, to selectively move between a closed position and an open position.

2. The system of claim 1, wherein the control circuit is configured such that when the primary channel is active the secondary channel is inactive, and vice-versa.

3. The system of claim 2, the actuator assembly comprises:
   a differential gear assembly coupled between the primary and secondary electric motors.

4. The system of claim 1, wherein each actuator is adapted to couple to a gas turbine engine unison ring.

5. The system of claim 1, further comprising:
an actuator position sensor coupled to the actuator assembly and configured to supply position signals representative of actuator assembly position.

6. The system of claim 1, further comprising:
a primary brake assembly coupled to the primary electric motor and configured to selectively (i) engage the primary electric motor, whereby the primary electric motor is prevented from supplying the drive force and (ii) disengage the primary electric motor, whereby the primary electric motor is allowed to supply the drive force; and
a secondary brake assembly coupled to the secondary electric motor and configured to selectively (i) engage the secondary electric motor, whereby the secondary electric motor is prevented from supplying the drive force and (ii) disengage the secondary electric motor, whereby the secondary electric motor is allowed to supply the drive force.

7. The system of claim 6, wherein:
the primary and secondary channels are further operable, in response to the guide vane position control signals, to selectively supply primary and secondary brake control signals, respectively; and
the primary and secondary brake assemblies are coupled to receive the primary and secondary brake control signals, respectively, and are respectively operable, in response thereto, to selectively engage and disengage, respectively, the primary and secondary electric motors.

8. The system of claim 7, wherein the primary and secondary brake assemblies are configured to engage the primary and secondary electric motor, respectively, at least when the brake assembly is de-energized.

9. The system of claim 1, further comprising:
a primary rotational position sensor coupled to the primary electric motor and configured to supply one or more signals representative of a rotational position of the primary electric motor; and
a secondary rotational position sensor coupled to the secondary electric motor and configured to supply one or more signals representative of a rotational position of the secondary electric motor.

10. The system of claim 9, wherein:
the primary channel (i) is coupled to receive the primary motor rotational position signals from the primary rotational position sensor and (ii) is configured to supply the guide vane actuation control signals based at least in part on the primary motor rotational position signals; and
the secondary channel (i) is coupled to receive the secondary motor rotational position signals from the secondary rotational position sensor and (ii) is configured to supply the guide vane actuation control signals based at least in part on the secondary motor rotational position signals.

11. The system of claim 1, wherein the primary and secondary electric motors are each brushless DC motors.

12. The system of claim 1, wherein the primary and secondary electric motors are each AC induction motors.

13. A gas turbine engine system, comprising:
an engine case;
a turbine mounted at least partially within the engine case and having a plurality of moveable inlet guide vanes;
a hardened unison ring rotationally coupled between the engine case and each of the inlet guide vanes; and
a guide vane actuation control system including:
a control circuit including a primary channel and a secondary channel, each channel adapted to receive one or more guide vane position control signals and operable, in response thereto, to supply guide vane actuation control signals,
a primary electric motor coupled to receive the guide vane actuation control signals from the primary channel and operable, in response thereto, to supply a drive force,
a secondary electric motor coupled to receive the guide vane actuation control signals from the secondary channel and operable, in response thereto, to supply a drive force, and
an actuator assembly coupled between the primary and secondary electric motors and the unison ring, the actuator assembly configured, upon receipt of the drive force therefrom, to selectively rotate the unison ring in either a first or a second direction, to thereby selectively move the inlet guide vanes between a closed position and an open position, respectively.

* * * * *